July 6, 1954  A. D. NICHOLS  2,683,006
ACCESSORY MOUNTING MEANS
Filed May 5, 1951  2 Sheets-Sheet 1
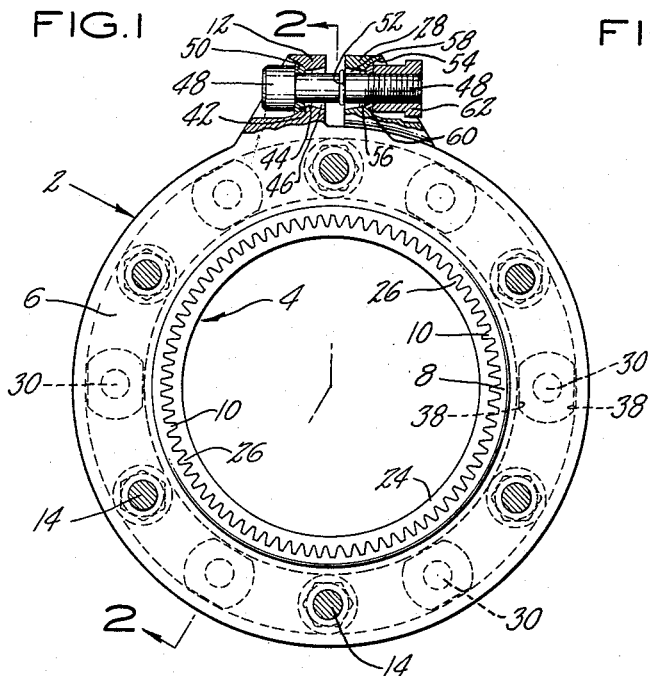
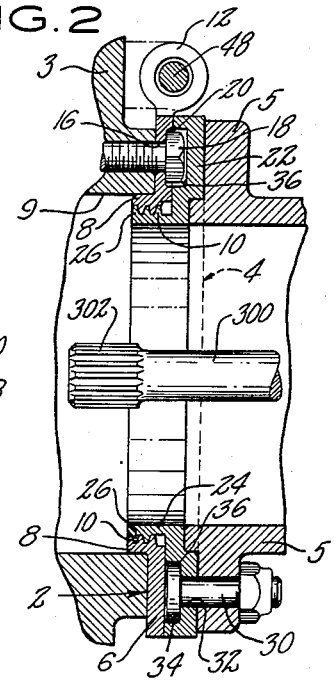
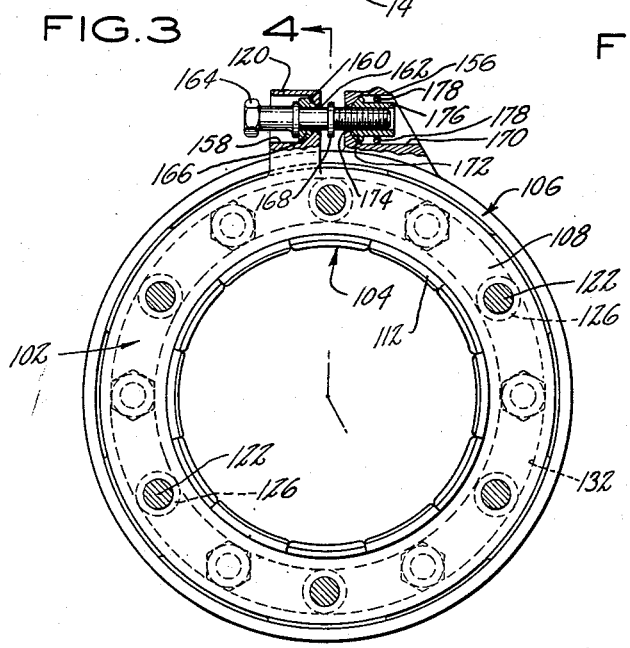
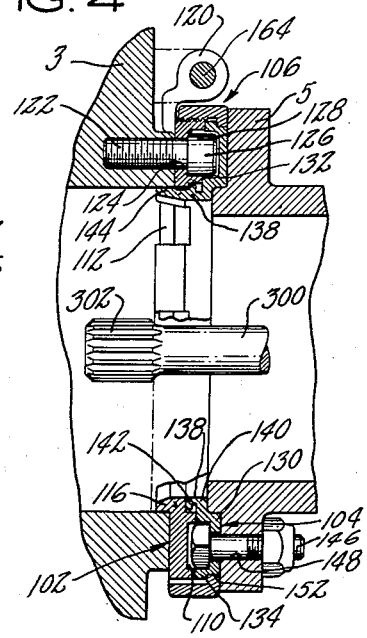
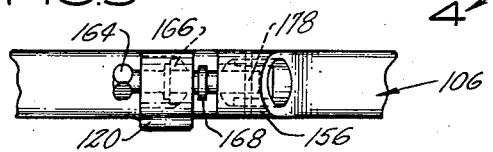
INVENTOR
ARNOLD D. NICHOLS
BY Jack N. McCarthy
AGENT

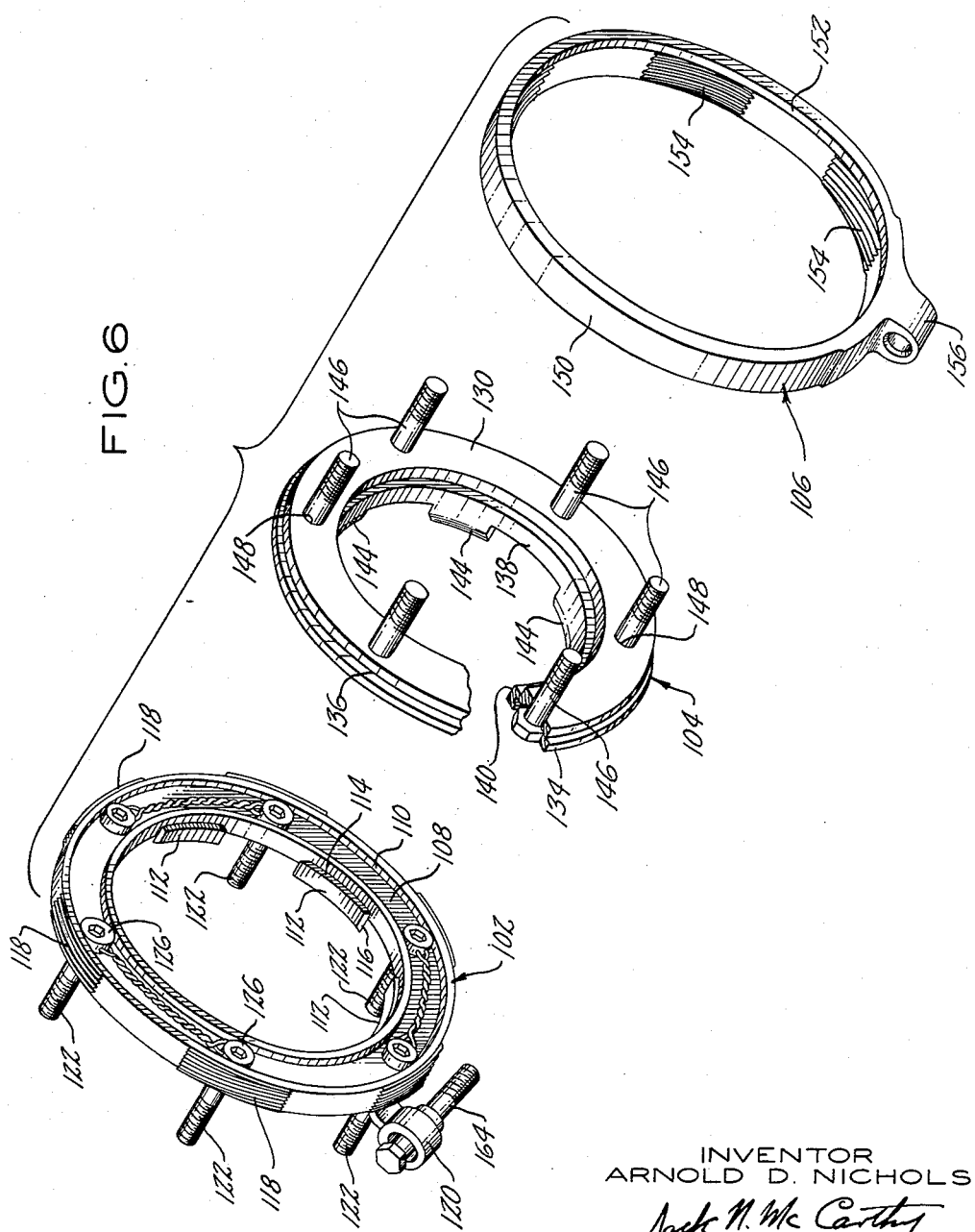

Patented July 6, 1954

2,683,006

UNITED STATES PATENT OFFICE 2,683,006

ACCESSORY MOUNTING MEANS

Arnold D. Nichols, Newington, Conn., assignor to United Aircraft Corporation, East Hartford, Conn., a corporation of Delaware Application May 5, 1951, Serial No. 224,765

3 Claims. (Cl. 248—2)

This invention relates to a mounting device for quickly attaching or detaching two members and in particular for mounting an engine driven accessory on an aircraft engine.

An object of this invention is to provide an accessory mount which will require only the tightening and securing of one bolt to place an accessory on an engine.

Another object is to provide a mount in which all the parts are attached either to the engine or to the accessory.

A further object is to provide an accessory mount which is desirable from the point of view of both servicing and assembling the accessory on the engine.

Fig. 1 is an accessory mount showing the mounting adapters assembled.

Fig. 2 is a view taken along the line 2—2 of Fig. 1 and also showing the mounting pads of the engine and accessory and the accessory shaft.

Fig. 3 is a modification of an accessory mount showing the mounting adapters assembled.

Fig. 4 is a view taken along the line 4—4 of Fig. 3 and also showing the mounting pads of the engine and accessory and the accessory shaft.

Fig. 5 is a top view of Fig. 3 showing the mounting bosses.

Fig. 6 is an exploded perspective view of the modification shown in Fig. 3.

Referring to Figs. 1 and 2, this device for mounting an accessory to an aircraft engine consists of two main parts: (1) an engine pad adapter 2 and (2) an accessory pad adapter 4.

The engine pad adapter 2 consists of an annular member 6 having a circular flange 8 at its inner diameter. Said flange extends inwardly towards the engine when mounted thereon and engages the opening 9 in the engine. Said flange is internally threaded with helical splines 10. A boss 12 extends from the outer periphery of said annular member 6 for a purpose to be described later. Said annular member is attached to the engine by bolts 14 through holes 16 in the member. The head 18 of each bolt 14 fits into a recess 20 which partially receives the head.

The accessory pad adapter 4 consists of an annular member 22 having a circular flange 24 at its inner diameter. Said flange extends outwardly away from an accessory when mounted thereon. Said flange is externally threaded with helical splines 26. This flange 24 is constructed so that its external splines cooperate with the internal splines of flange 8 on the engine pad adapter. A boss 28 is mounted on the outer periphery of said member for a purpose to be described later. Said annular member 22 is attached to the accessory by bolts 30 through holes 32 in the member. The head 34 of each bolt 30 fits into an annular groove 36 which entirely receives the head. Each bolt head is flat on two sides as at 38 to fit in said groove and prevent the bolt from turning. This groove also receives the projecting portion of the heads 18 of the bolts 14.

The boss 12 on the engine pad adapter 2 has a hole therethrough extending substantially in the plane of the adapter and substantially in a direction tangent to the outer periphery of the adapter. Boss 12 may be mounted directly on the engine as shown in dot-dash lines in Fig. 2. The hole is formed of three different shapes; the first portion 42 is spherical in shape, the second portion 44 is cylindrical in shape, and the third portion 46 is flanged outwardly. A bolt 48 is placed into said hole with a socket member 50 mounted thereon fitting into said socket portion 42 and projecting through the cylindrical and flanged portions 44 and 46 of the hole. To prevent the bolt 48 from falling out a snap ring 52 is placed on the bolt.

The boss 28 on the accessory adapter 4 also has a hole therethrough extending in the same plane as the hole in boss 12 and substantially in a direction tangent to the outer periphery of the adapter. This hole is also formed of three different shapes; the first part 54 is spherical in shape, the second portion 56 is cylindrical in shape and the third portion 58 is flanged outwardly.

In mounting an accessory 5 on an engine 3, an accessory pad adapter 4 is first securely bolted to the accessory and an engine pad adapter 2 is securely bolted to the engine. These adapters are then mounted together by placing the end of the external helical splines 26 of the accessory pad adapter between the ends of the internal helical splines 10 of the engine pad adapter and turning the accessory adapter so that it is threadably secured to the engine adapter and places the boss 28 of the accessory adapter close enough to the boss 12 of the engine adapter to permit the bolt 48 to extend through the flanged portion 58 of the hole of the boss 28 and into the spherical portion 54 far enough to place a socket member 60 and a nut 62 over the end of the bolt. As can be seen, the construction of the holes permits the bolt 48 to be extended therethrough even though the centerlines of the holes are not aligned and the socket members permit the bolt to draw the bosses together as the nut is threaded thereon. The nut and bolt are safety wired after the adapters have been securely fastened. This mounts the accessory on the engine.

Referring to Figs. 3, 4, 5 and 6, this modification for mounting an accessory to an aircraft engine consists of three main parts: (1) an engine pad adapter 102, (2) an accessory pad adapter 104 and (3) a lock ring 106.

The engine pad adapter 102 consists of an annular member 108 having a circular groove 110 therearound located on the side of the member facing away from the engine when mounted. Torque transmitting splines or lugs 112 extend radially inward from the inner periphery of said annular member 108 as at 114 and project inwardly towards the engine as at 116. Interrupted screw thread or spline sections 118 are located around the outer periphery of annular member 108 and project therefrom. A boss 120 extends from said annular member for a purpose to be described later. Said annular member is attached to an engine by bolts 122 through holes 124 in the member. The head 126 of each bolt 122 fits into a recess 128 which partially receives the head.

The accessory pad adapter 104 consists of an annular member 130 having a circular groove 132 therearound located on the side of the member facing away from the accessory when mounted. A circular flange 134 extends radially outward from the outer periphery of said annular member forming a circular notch 136 with said member. A circular flange 138 extends radially inward from the inner periphery of said annular member 130 as at 140 and projects outwardly away from the accessory as at 142. Torque transmitting splines or lugs 144 project from the flange 138 in a direction away from the accessory. These splines 144 also pilot the accessory pad adapter on the engine. Said annular member is attached to an accessory by bolts 146 through holes 148 in the member. The head of each bolt 146 prevents the bolt from turning by having the flat sides of the head against the sides of groove 132.

The lock ring 106 consists of an annular member 150 having a circular flange 152 at one end extending radially inward. Said member also has interrupted screw thread or spline sections 154 around its inner periphery which project therefrom. A boss 156 is mounted on the outer periphery of said member for a purpose to be described later.

The boss 120 on the engine pad adapter 102 has a hole therethrough extending substantially in the plane of the adapter and substantially in a direction tangent to the outer periphery of the adapter. Boss 120 may be mounted directly on the engine as shown in dot-dash lines in Fig. 4. The hole is formed of three different shapes; the first portion 158 is cylindrical in shape, the second portion 160 is spherical in shape, and the third portion 162 is flanged outwardly.

A bolt 164 is placed into said hole with a socket member 166 mounted thereon fitting into said spherical portion 160 and with the bolt 164 projecting through the flange portion 162 of the hole. To prevent the bolt 164 from falling out a snap ring 168 is placed on the bolt.

The boss 156 on the accessory adapter 104 also has a hole therethrough extending in the same plane as the hole in boss 120 and substantially in a direction tangent to the other periphery of the adapter. This hole is also formed of three different shapes. The first portion 170 is cylindrical in shape, the second portion 172 is spherical in shape, and the third portion 174 is flanged outwardly.

In mounting an accessory 5 on an engine 3 using this modification, a lock ring 106 is placed over an accessory pad adapter 104 with the circular flange 152 of the lock ring being placed in circular notch 136 of the accessory pad adapter. The width of the flange 152 is slightly less than the notch 136 which permits the ring 106 to move relative to the accessory pad adapter when said adapter is bolted to the accessory. The accessory pad adapter is then securely bolted to the accessory and an engine pad adapter 102 is securely bolted to the engine. These adapters 102 and 104 are then mounted together by placing the free ends of the torque transmitting splines or lugs 144 of the accessory pad adapter through annular member 108 and between the torque transmitting splines or lugs 112 of the engine pad adapter, and the interrupted screw thread or spline sections 154 of the lock ring are placed between the interrupted screw thread or spline sections 118 of the engine pad adapter. These interrupted screw thread or spline sections are so placed that the boss 156 of the lock ring 106 will be positioned close enough to the boss 120 of the engine adapter 102 to permit the bolt 164 to extend through the flanged portion 174 of the hole of the boss 156 and into the sperical portion 172 far enough to place a socket member 176 over the end of bolt 164 when the lock ring 106 has been rotated with its interrupted screw thread or spline portions 118 of the engine pad adapter. The members are then moved together until both members are securely mated. The lock ring 106 is then rotated to engage its interrupted screw thread or spline portions 154 with the interrupted screw thread or spline portions 118 of the engine pad adapter to threadably secure the ring 106 to the engine pad adapter 102. The bolt 164 is positioned and the socket member 176 is placed over the end and is tightened.

As can be seen, the construction of the holes in bosses 120 and 156 permits the bolt 164 to be extended therethrough even though the center lines of the holes are not aligned and the socket member 166 permits the bolt to draw the bosses together along with socket member 176 as it is threaded thereon. Pins 178 hold member 176 in place. The bolt and socket member are safety wired after the adapters have been securely fastened. This mounts the accessory on the engine.

In each modification once an engine pad adapter has been secured to an engine and an accessory pad adapter has been secured to an accessory, they remain secured and the only movement necessary to prepare the removal of an accessory from an engine is the unthreading of the holding bolt 48 or 164 from its securing member. The accessory driven shaft 300 is shown (see Figs. 2 and 4) with its splined end 302 to disclose the positioning of the shaft within the adapters.

Although a specific mounting device has been shown and described herein for purpose of illustration, it will be evident to those skilled in the art that the invention is capable of various modifications and adaptations within the scope of the appended claims.

I claim:

1. An attachment for connecting a first member to a second member, the latter having a mounting pad thereon, said mounting pad having a circular opening therein, said attachment including a first adapter adapted to be fixed to said second member, said first adapter being annular and having splines projecting inwardly from its inner periphery and axially away from said adapter, said first adapter having interrupted threaded sections projecting outwardly from its outer periphery, the splines of said first adapter being adapted to project into said circular opening of said second member, a second adapter adapted to be fixed to said first member, said second adapter being annular and having a circular flange extending around its outer periphery, said second adapter having axially extending splines projecting beyond its face, said splines of said second adapter being adapted to fit between the splines of the first adapter, the splines of said second adapter being also adapted to have a slidable fit within said circular opening of said second member, and a lock ring for fixing said first adapter to said second adapter, said lock ring being annular and having an annular flange extending radially inward and having interrupted threaded sections projecting inwardly from its inner periphery, said annular flange of said lock ring being adapted to engage the circular flange extending around the outer periphery of said second adapter, the interrupted threaded sections of said lock ring being adapted to engage the interrupted threaded sections of said first adapter.

2. An attachment for connecting a first member to a second member, the latter having a mounting pad thereon, said mounting pad having a circular opening therein, said attachment including a first adapter adapted to be fixed to said second member, said first adapter being annular and having splines projecting inwardly from its inner periphery and axially away from said adapter, said first adapter having interrupted threaded sections projecting outwardly from its outer periphery, the splines of said first adapter being adapted to project into said circular opening of said second member, a second adapter adapted to be fixed to said first member, said second adapter being annular and having a circular flange extending around its outer periphery, said second adapter having axially extending splines projecting beyond its face, said splines of said second adapter being adapted to fit between the splines of the first adapter, the splines of said second adapter being also adapted to have a slidable fit within said circular opening of said second member, and a lock ring for fixing said first adapter to said second adapter, said lock ring being annular and having an annular flange extending radially inward and having interrupted threaded sections projecting inwardly from its inner periphery, said annular flange of said lock ring being adapted to engage the circular flange extending around the outer periphery of said second adapter, the interrupted threaded sections of said lock ring being adapted to engage the interrupted threaded sections of said first adapter, said lock ring having a boss thereon, said second member having a boss fixed thereto, each boss having a hole therethrough, and a bolt for extending through each hole to hold said lock ring in place.

3. An attachment for connecting a first member to a second member, the latter having a mounting pad thereon, said mounting pad having a circular opening therein, said attachment including a first adapter adapted to be fixed to said second member, said first adapter having splines projecting inwardly from its inner periphery and axially away from said adapter, said first adapter having interrupted threaded sections projecting outwardly from its outer periphery, the splines of said first adapter being adapted to project into said circular opening of said second member, a second adapter adapted to be fixed to said first member, said second adapter having a circular flange extending around its outer periphery, said second adapter having axially extending splines projecting beyond its face, said splines of said second adapter being adapted to fit between the splines of the first adapter, the splines of said second adapter being also adapted to have a slidable fit within said circular opening of said second member, and lock means for fixing said first adapter to said second adapter, said lock means having an annular flange extending radially inward and having interrupted threaded sections projecting inwardly from its inner periphery, said annular flange of said lock means being adapted to engage the circular flange extending around the outer periphery of said second adapter, the interrupted threaded sections of said lock means being adapted to engage the interrupted threaded sections of said first adapter.

References Cited in the file of this patent

UNITED STATES PATENTS

| Number | Name | Date |
|---|---|---|
| 193,166 | Littlejohn | July 17, 1877 |
| 620,821 | Abbey et al. | Mar. 7, 1899 |
| 1,277,398 | Elliott | Sept. 3, 1918 |
| 1,386,210 | Thomas | Aug. 2, 1921 |
| 1,388,540 | Wise | Aug. 23, 1921 |
| 1,485,252 | Denis | Feb. 26, 1924 |
| 2,025,113 | Laurent | Dec. 24, 1935 |
| 2,042,125 | Roach | May 26, 1936 |
| 2,195,492 | McDonald | Apr. 2, 1940 |
| 2,460,502 | Heintz | Feb. 1, 1949 |
| 2,467,770 | Mulheim | Apr. 19, 1949 |
| 2,513,734 | Nardone | July 4, 1950 |